United States Patent
Nguyen et al.

(10) Patent No.: US 10,833,818 B2
(45) Date of Patent: Nov. 10, 2020

(54) RESOURCE EXCLUSION IN A HALF DUPLEX BASED WIRELESS COMMUNICATION SYSTEM

(71) Applicant: QUALCOMM Incorporated, San Diego, CA (US)

(72) Inventors: Tien Viet Nguyen, Bridgewater, NJ (US); Kapil Gulati, Hillsborough, NJ (US); Sudhir Kumar Baghel, Hillsborough, NJ (US); Arjun Bharadwaj, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/680,143

(22) Filed: Nov. 11, 2019

(65) Prior Publication Data
US 2020/0153554 A1 May 14, 2020

Related U.S. Application Data

(60) Provisional application No. 62/760,822, filed on Nov. 13, 2018.

(51) Int. Cl.
*H04L 1/18* (2006.01)
*H04W 72/12* (2009.01)
(Continued)

(52) U.S. Cl.
CPC ......... *H04L 1/189* (2013.01); *H04W 72/0446* (2013.01); *H04W 72/0453* (2013.01);
(Continued)

(58) Field of Classification Search
None
See application file for complete search history.

(56) References Cited

U.S. PATENT DOCUMENTS

2016/0165640 A1* 6/2016 Yang ............... H04W 74/08
370/336
2018/0123765 A1* 5/2018 Cao ............... H04L 1/1822
(Continued)

FOREIGN PATENT DOCUMENTS

EP 3282618 A1 2/2018
WO 2016022200 A1 2/2016

OTHER PUBLICATIONS

CATT: "RPT Design for Broadcast Communication", 3GPP Draft; R1-142077, 3rd Generation Partnership Project (3GPP), Mobile Competence Centre; 650, Route Des Lucioles; F-06921 Sophia-Antipolis Cedex; France, vol. RAN WG1, No. Seoul, Korea; May 19, 2014-May 23, 2014 May 10, 2014 (May 10, 2014), XP050814574, 4 pages, Retrieved from the Internet: URL: http://www.3gpp.org/ftp/tsg_ran/WG1_RL1/TSGR1_77/Docs/ [retrieved on May 10, 2014].
(Continued)

*Primary Examiner* — Eunsook Choi
(74) *Attorney, Agent, or Firm* — Arent Fox LLP

(57) ABSTRACT

Methods, apparatuses, and computer-readable mediums for wireless communication by a user equipment (UE) includes transmitting a packet on a first resource, determining one or more repetition resources on which to send one or more redundancy versions of the packet, wherein the one or more repetition resources are at a time subsequent to the first resource, transmitting repetition resource information identifying the one or more repetition resources to one or more neighboring UEs, and transmitting the one or more redundancy versions of the packet on respective ones of the one or more repetition resources.

78 Claims, 4 Drawing Sheets

(51) Int. Cl.
*H04W 72/04* (2009.01)
*H04L 5/16* (2006.01)

(52) U.S. Cl.
CPC ... *H04W 72/1268* (2013.01); *H04W 72/1289* (2013.01); *H04L 5/16* (2013.01)

(56) References Cited

U.S. PATENT DOCUMENTS

| | | | |
|---|---|---|---|
| 2018/0219649 A1* | 8/2018 | Ying | H04L 1/1816 |
| 2018/0302916 A1* | 10/2018 | Lee | H04L 5/0012 |
| 2019/0053211 A1* | 2/2019 | Ying | H04W 72/044 |
| 2019/0059115 A1* | 2/2019 | Uchiyama | H04W 92/18 |
| 2019/0132824 A1* | 5/2019 | Jeon | H04W 72/042 |
| 2019/0166619 A1* | 5/2019 | Takeda | H04W 72/12 |
| 2019/0191461 A1* | 6/2019 | Lee | H04L 1/0061 |
| 2019/0223190 A1* | 7/2019 | Hwang | H04L 1/08 |
| 2019/0261214 A1* | 8/2019 | Kim | H04W 4/027 |
| 2019/0268097 A1* | 8/2019 | Panteleev | H04W 72/042 |
| 2019/0296865 A1* | 9/2019 | Chen | H04L 1/189 |
| 2020/0036481 A1* | 1/2020 | Chen | H04L 1/18 |

OTHER PUBLICATIONS

International Search Report and Written Opinion—PCT/US2019/061016—ISA/EPO—Apr. 23, 2020.

\* cited by examiner

RESOURCE EXCLUSION IN A HALF DUPLEX BASED WIRELESS COMMUNICATION SYSTEM

CROSS REFERENCE TO RELATED APPLICATIONS

The present application claims priority to U.S. Provisional Application No. 62/760,822 entitled "Resource Exclusion in a Half Duplex Based Wireless Communication System," filed on Nov. 13, 2018, the contents of which are incorporated by reference in their entireties.

BACKGROUND

The present disclosure relates generally to communication systems, and more particularly, to resource exclusion in a half duplex based wireless communication system.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard.

There exists a need for further improvements in 5G NR technology, as the need for high reliability communications may be constrained by limited availability of network resources.

For example, a vehicle-to-anything (V2X) communication system may operate using half duplex transmissions, and hence may require more resources to ensure successful receipt of those transmissions. For example, if two UEs have even partially overlapping transmissions, then they cannot receive transmissions from each other due to the half duplex nature of the transmissions. In other words, in a half duplex based system, during transmitting a transmission, the UE cannot receive any other transmissions, which results in packet loss. This packet loss creates the need for the UEs operating in the half duplex based system to send a number of repetitions of the transmission to ensure receipt by other UEs. Consequently, more network resources are utilized by all of the repetitions of the transmission, and also the amount of interference in the network is increased because of the increased number of repetitious transmissions. These issues reduce network throughput. Thus, improvements in half duplex based communication systems are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Methods, apparatuses, and non-transitory computer-readable mediums for wireless communication are disclosed by the present disclosure.

In an aspect, a method, apparatus, and/or computer-readable medium for wireless communication by a UE includes components, means, or code for transmitting a packet on a first resource, and determining one or more repetition resources on which to send one or more redundancy versions of the packet, wherein the one or more repetition resources are at a time subsequent to the first resource. The method further includes transmitting repetition resource information identifying the one or more repetition resources to one or more neighboring UEs, and transmitting the one or more redundancy versions of the packet on respective ones of the one or more repetition resources.

In one aspect of the present disclosure, a method of wireless communications includes transmitting a packet on a first resource, determining a repetition resource on which to send a redundancy version of the packet, wherein the repetition resource is at a time subsequent to the first resource, transmitting repetition resource information identifying the repetition resource to one or more neighboring UEs, and transmitting the redundancy version of the packet on the repetition resource.

Some aspects of the present disclosure includes a non-transitory computer-readable medium of a UE, the computer-readable medium storing computer executable code comprising code to transmit a packet on a first resource, determine a repetition resource on which to send a redundancy version of the packet, wherein the repetition resource is at a time subsequent to the first resource, transmit repetition resource information identifying the repetition resource to one or more neighboring UEs, and transmit the redundancy version of the packet on the repetition resource.

Certain aspects of the present disclosure includes a user equipment having a memory and a processor in communication with the memory, wherein the processor is configured to transmit a packet on a first resource, determine a repetition resource on which to send a redundancy version of the packet, wherein the repetition resource is at a time subsequent to the first resource, transmit repetition resource information identifying the repetition resource to one or more neighboring UEs, and transmit the redundancy version of the packet on the repetition resource.

Aspects of the present disclosure includes a user equipment having means for transmitting a packet on a first resource, means for determining a repetition resource on which to send a redundancy version of the packet, wherein the repetition resource is at a time subsequent to the first resource, means for transmitting repetition resource information identifying the repetition resource to one or more neighboring UEs, and transmitting the redundancy version of the packet on the repetition resource.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
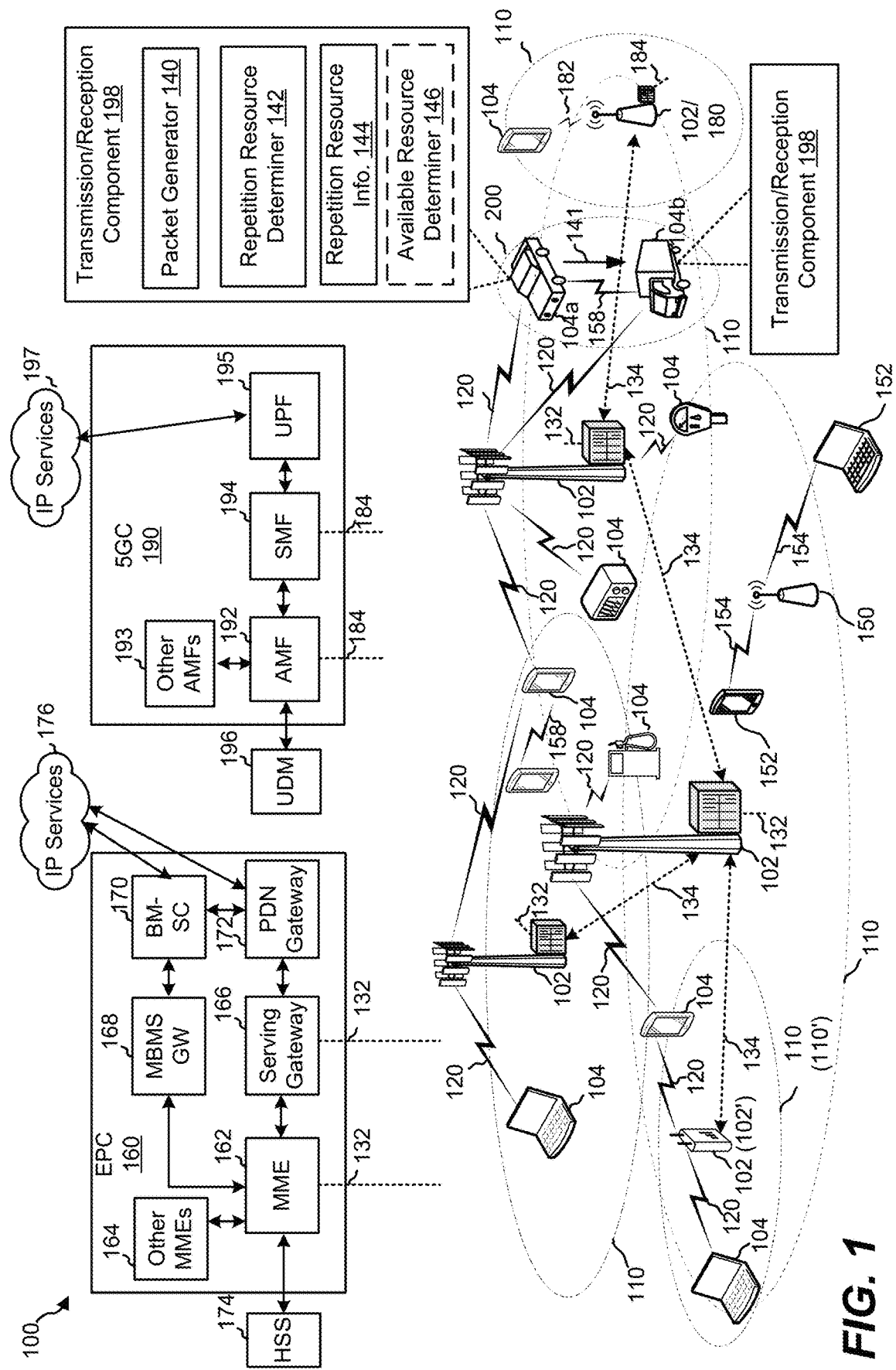
FIG. 1 is a schematic diagram of an example wireless communications system and an access network.

The present disclosure provides solutions for increasing efficiency in communications in a half duplex-based communication network, such as a V2X network, by configuring the UEs to provide notice to one another of reserved resources that will be used for sending redundancy versions of packets. This allows a UE receiving the notice to exclude the reserved resources from available resources. As such, the UE receiving the notice may then reserve non-conflicting resources, or at least a reduced amount of conflicting resources, for transmitting redundancy versions of its own packets. Thus, aspects of the present disclosure may conserve network resources and/or meet high communication reliability requirements.

In particular, in the present disclosure, a number of repetitions of transmitting redundancy versions of a packet are known ahead of time, e.g., when the first repetition is sent. As such, the UE can choose at least the next repetition resources, e.g., time and/or frequency resource blocks, also referred to as repetition resources, prior to sending the number of repetitions. Further, the UE can communicate information identifying the chosen repetition resources to other UEs, such as in control data, e.g., via a control channel or a side link control channel. Consequently, the other UEs receiving the information identifying the chosen repetition resources can exclude those resources when they choose repetition resources for their own first and subsequent repetitions of transmitting a redundancy version of a packet. As a result, based on the present solution, collisions between transmissions of UEs operating in the half duplex-based communication network may be reduced, thereby reducing interference in the network and improving communication reliability.

Further, the solution of the present disclosure may enable UEs in the half duplex-based communication network to overcome communication reliability issues associated with bursty network traffic that may be experienced in current systems operating without the present solution. For instance, when traffic is bursty, the first repetition is collision prone.

According to the present disclosure, however, the UE may randomly choose the repetition resources for one or more of the number of repetitions for transmitting redundancy versions of the packet. The random selection of the future repetition resources may reduce a likelihood of those future repetition resources colliding with the bursty traffic.

In some implementations, to reduce an amount of network overhead (e.g., control transmissions) used by the present solution, the UE may be configured to choose the repetition resources from a set of predefined patterns of resources. The set of predefined patterns of resources may be time and/or frequency hopping patterns. Further, the available patterns in the set of predefined patterns of resources may depend on the required amount of resources (number of resource blocks (RBs), number of transmission time intervals (TTIs) per repetition, number of repetitions) for send the redundancy versions of the packet. Further, the UE may select a pattern from the set of predefined patterns either randomly, based on a UE identifier, based on a geographic location of the UE, or based on a network configuration. In some cases, if none of the set of predefined patterns is sufficient to provide the required amount of resources, then the UE may select a pattern having an acceptable amount of collisions with non-available resources, or the UE may wait until additional resources become available.

Additionally, in some implementations, the amount of network overhead used by the present solution may be reduced by limiting the UE to reserving the repetition resources for only a subset of the number of repetitions for transmitting redundancy versions of the packet. For example, the UE may be limited to reserving repetition resources for only the next one or two repetitions. This implementation still provides flexibility in resource selection, but also allows the UE to adapt unreserved resource to changes in resource availability. For instance, the UE can flexibly adapt the repetition resource per each repetition (i.e., change number of RBs, number of repetitions per TTI) to fit the available resources. In some cases, the UE can control delay and priority in the transmissions of the number of repetitions by applying a minimum inter-repetition gap and a maximum inter-repetition gap, where the gap may refer to a time duration, a number of slots, etc. For instance, the minimum and maximum inter-repetition gaps may be set to relatively low values in response to a delay tolerance for delivery of the packet being relatively low, or the minimum and maximum inter-repetition gaps may be set to relatively high values in response to the delay tolerance for delivery of the packet being relatively high. Alternatively or in addition, the values of the minimum and maximum inter-repetition gaps may be set as a function of congestion (e.g., gap values reduced when congestion increases).

Further, in some implementations, the amount of network overhead used by the present solution may be reduced by configuring the UE to only transmit a redundancy version of the packet in response to receiving a non-acknowledgement (NACK) of receipt of the packet. For instance, in this case, the UE may only reserve repetition resources for a next retransmission (e.g., a next repetition of the transmission of the redundancy version of the packet), thereby freeing up future available resources. Moreover, in some cases, a UE receiving information from a second UE about repetition resources reserved by the second UE may only exclude those repetition resources if the UE also received the NACK for the packet corresponding to the repetition resources being reserved by the second UE. This may help ensure that resources are only excluded when they can be associated with NACK'd transmissions.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Referring to FIG. 1, an example of a wireless communications system and an access network 100 includes UEs 104 that may be configured for excluding resources available for repetitions transmissions of redundancy versions of a packet, which may improve packet receipt and/or reduce interference. For example, in an aspect, some UEs 104 may be configured for performing V2X communications with other UEs 104, for example, over device-to-device (D2D) communication links 158 in a D2D communications system 200. The UEs 104 may include various devices related to vehicles and transportation. For example, the UEs 104 may include vehicles, devices within vehicles, and transportation infrastructure such as roadside devices, tolling stations, fuel supplies, or any other device that may communicate with a vehicle.

In particular, the UEs 104 are configured to implement a transmission/reception component 198 to conserve network resources and/or meet the high reliability requirements of V2V and/or V2X communications in the D2D communications system 200. For example, in an aspect, the UEs 104 in the D2D communications system 200 may include a transmission/reception component 198 configured to execute a packet generator 140 to generate a packet 141. In this example, UE 104a may generate the packet 141 and transmit it to UE 104b, such as using a half duplex communication. Further, the transmission/reception component 198 may further include a repetition resource determiner 142 configured to identify repetition resources for use by UE 104a in transmitting a number of repetitions of a redundancy version of the packet 141 to UE 104b. In order to avoid conflicting resource usage, repetition resource determiner 142 may further generate repetition resource information 144, which identifies the one or more repetition resources that have been reserved. UE 104a may then transmit the repetition resource information 144 to UE 104b, which enables UE 104b to exclude the identified repetition resources from consideration for use in transmitting its own repetitions of redundancy versions of a packet. Optionally, the transmission/reception component 198 may further include an available resource determiner 146, which may receive repetition resource information from other UEs and exclude the identified resources from a set of available resources that UE 104a may use.

Further details of the transmission/reception component 198 and the features of the present disclosure are described below with reference to FIGS. 2-4.

Still referring to FIG. 1, the wireless communications system (also referred to as a wireless wide area network (WWAN)) further includes base stations 102, an Evolved Packet Core (EPC) 160, and a 5G Core (5GC) 190. The base stations 102 may include macro cells (high power cellular base station) and/or small cells (low power cellular base station). The macro cells include base stations. The small cells include femtocells, picocells, and microcells. The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cells and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

As mentioned above, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR. Additionally, the D2D communication link 158 may be implemented in vehicular systems, such as vehicle-to-vehicle (V2V) and/or vehicle-to-everything (V2X) networks and/or enhanced vehicle-to-everything (eV2X) networks.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides quality of service (QoS) flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station 102 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
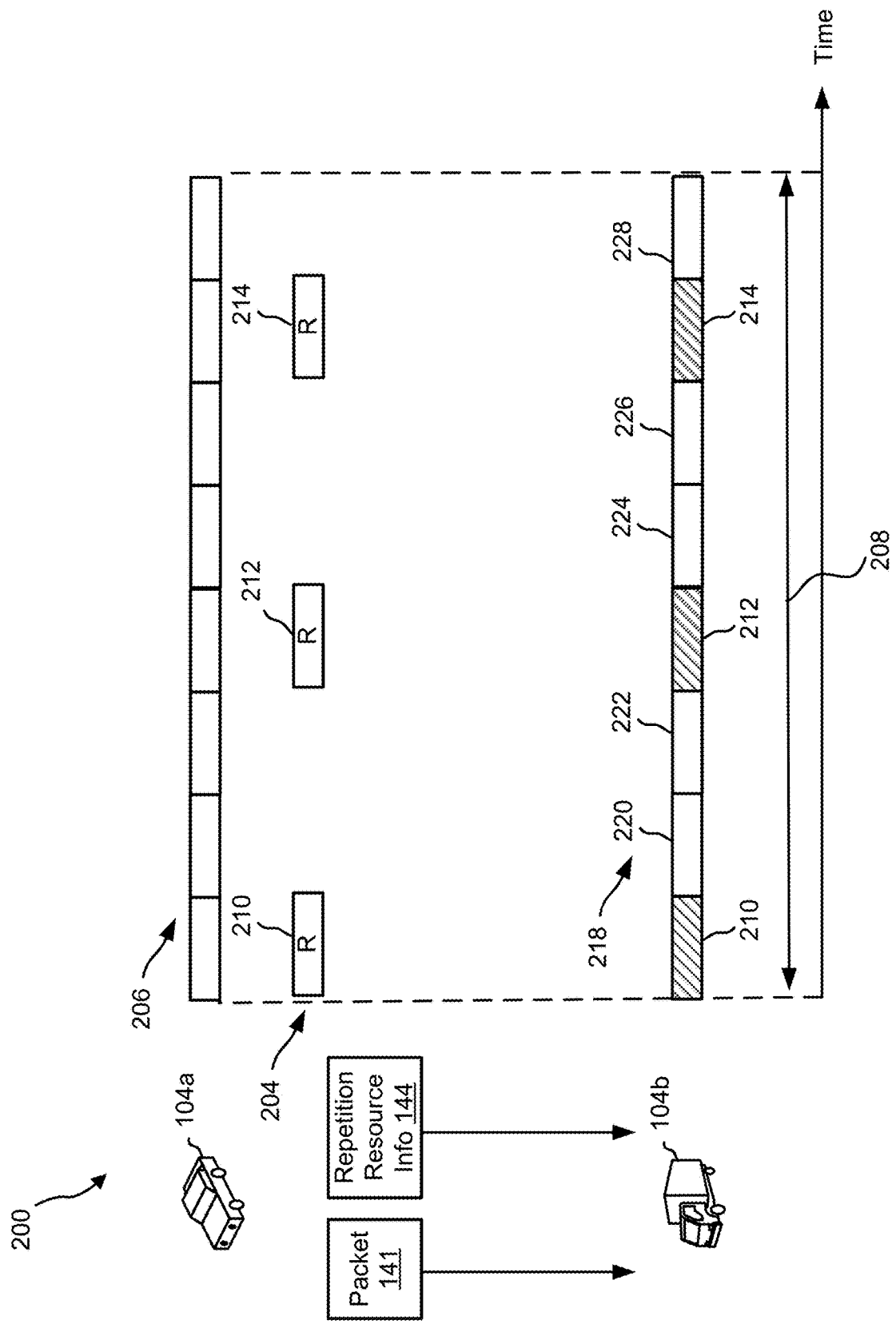
FIG. 2 is a schematic diagram of an example of operation of a UE according to the present disclosure.

Referring to FIG. 2, in one example of operation, UE 104*a* operating in a half duplex communication system may initially transmit a data packet 141 to UE 104*b*. Further, UE 104*a* may then determine to send a number of redundancy versions of the packet 141 to the UE 104*b*, and may identify one or more repetition resources 204 from a set of available resources 206 on which to send the redundancy versions. For instance, the set of available resources 206 may be within a first window 208 corresponding to a packet delay budget of the data packet 202. Also, in this example, the repetition resources may be resources 210, 212, and 214. The UE 104*a* may then generate repetition resource information 144, which identifies the particular resources reserved as the repetition resources 204, and send the repetition resource information 144 to the UE 104*b*. Consequently, the UE 104*b* can determine its available set of resources 218 for use in transmitting redundancy versions of data packets that UE 104*b* transmits by excluding the repetition resources 204 of UE 104*a*, as identified by the repetition resource information 144, from the available set of resources 206. In this example, for instance, the available set of resources 218 for UE 104*b* includes resources 220 222, 224, 226, and 228. As such, the present disclosure enables UE 104*a* and UE 104*b* to respectively transmit redundancy versions of data packets with no interference or with reduced interference with one another.

Figure 3:
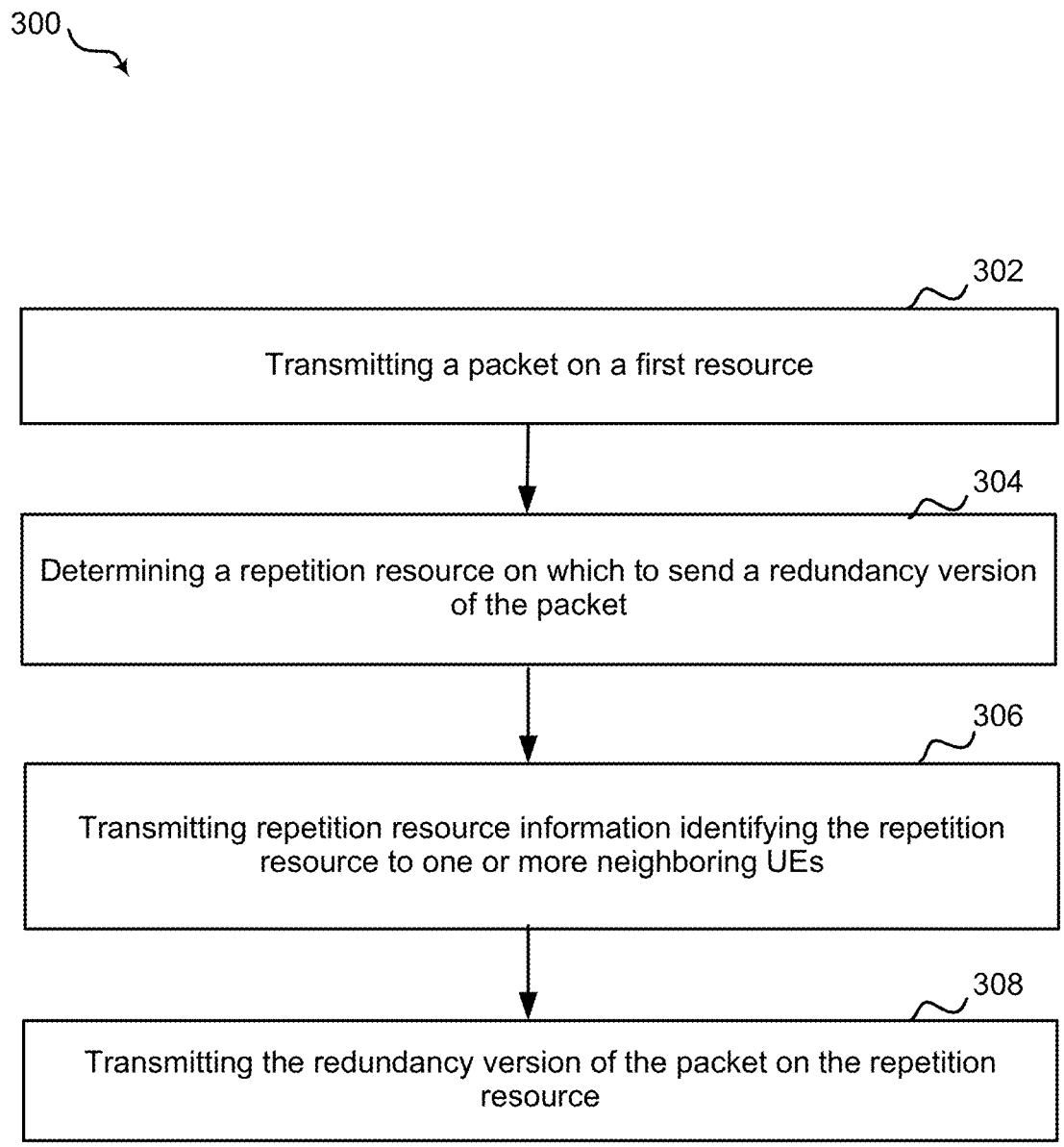
FIG. 3 is a flowchart of an example method of wireless communication by the UE of FIGS. 1 and 2.

Referring to FIG. 3, an example of a method 300 of wireless communication may be performed by UE 104, which may be operating in a half duplex based communication network. The actions of method 300 may be functions executed by one or more components of UE 104, such as the transmission/reception component 198 or subcomponents thereof, and/or may be defined by computer-executable instructions or code executable by a processor of UE 104. Also, this discussion of the method 300 may be described with reference to one or more components of an example UE 104 (see, e.g., FIG. 1 and/or FIG. 4).

At block 302, the method 300 may include transmitting a packet on a first resource. For example, in an aspect, UE 104 may operate one or any combination of transmission/reception component 198, packet generator 140, modem 414, processor(s) 412, transceiver 402, RF front end 488, and antennae 465 to transmit packet 141 on the first resource, which may be a time and/or frequency resource block. The transmission/reception component 198 and/or the processor 412 may transmit and/or receive data, such as a packet on a first resource. Specifically, the transmission/reception component 198 may send the digital data associated with the packet to the transceiver 402 or the transmitter 408. The transceiver 402 and/or the transmitter 408 may convert the digital data into electrical data signal, and send to the RF front end 488. The RF front end 488 and one or more of the subcomponents, such as the PAs 498 and/or the filters 496, may filter, amplify, and/or convert the electrical data signals into electro-magnetic transmission signals. The one or more antennas 465 may transmit electro-magnetic transmission signals containing the digital data in the packet.

In certain implementations, the processor 412, the modem 420, the transmission/reception component 198, the transceiver 402, the receiver 406, the transmitter 408, the RF front end 488, and/or the subcomponents of the RF front end 488 may be configured to and/or may define means for transmitting a packet on a first resource.

At block 304, the method 300 includes determining a repetition resource on which to send a redundancy version of the packet, wherein the repetition resource is at a time subsequent to the first resource. For example, in an aspect, UE 104 may operate one or any combination of transmission/reception component 198, repetition resource determiner 142, modem 414, processor(s) 412, transceiver 402, RF front end 488, and antennae 465 to determining one or more repetition resources 204 on which to send a redundancy version of the packet 141, wherein the one or more repetition resources 204 is at a time subsequent to the first resource. In some cases, the one or more repetition resources 204 may be chosen to avoid a time overlap with resources being used by other UEs, or chosen to avoid a time and frequency collision with resources used by other UEs (e.g., to reduce interference), or both.

In some cases of method 300, determining the repetition resource at block 304 includes randomly selecting the repetition resource. For instance, the randomly selected repetition resources may be selected within a set of resources in a window that satisfies a packet delay budget of the packet 141, e.g., to ensure the packet 141 is received according to, for example, QoS requirements. Further, the random selection of resources helps to overcome bursty traffic in the network, as UE 104 may not necessarily know about the existence of bursty traffic.

In some cases of method 300, determining the repetition resource at block 304 includes at least one of determining one or a plurality of time-based resources, or determining one or a plurality of time and frequency resources. In some implementations of this case, a frequency of the one or the plurality of time and frequency resources comprises either a same frequency as the first resource for the transmitting of the redundancy version of the packet, or a matching frequency for at least two consecutive transmissions of the redundancy version of the packet, or a second frequency different from a first frequency of the first resource. As such, the one or more repetition resources 204 may include time hopping and/or frequency hopping resources, although some repetition can be back-to-back at the same frequency in order to reduce control overhead.

In some cases of method 300, determining the repetition resource at block 304 includes selecting the repetition resource from a set of predefined resources. In a scenario where the set of predefined resources includes an available set of resources within a time window corresponding to a packet delay budget for the transmitting of the packet, then the method 300 at block 304 may further include selecting one of the available set of resources having an amount of resource collision within an acceptable collision threshold with respect to a non-available set of resources within the time window corresponding to the packet delay budget. Further, this selecting may further include ranking sets of resources in the available set of resources in an increasing order of number of collisions, where the selecting of one of the available set of resources comprises randomly selecting from a subset of highest ranked ones of the sets of resources. For instance, in one implementation, the UE 104 may rank the resources in increasing order of collision, and then choose randomly among those meeting an acceptable collision threshold (e.g., no more than 20% collision, or some other configurable number). This technique may be used both in a case where the repetition resources are chosen explicitly and in a case where the repetition resources are chosen from a set of predefined patterns (e.g., hopping patterns).

In some instances, a set of patterns of resources within the set of predefined resources depends on a required amount of resources for the transmitting of the redundancy version of the packet, or for the transmitting of the redundancy version of the packet and one or more additional transmissions of the redundancy version of the packet. In this situation, the required amount of resources may comprise one or more of a number of resource blocks, a number of transmission time intervals (TTIs) per transmission of the redundancy version of the packet, or a number of repetitions of the transmission of the redundancy version of the packet. Additionally, in some implementations of this case, the method 300 at block 304 may further include selecting a pattern from the set of patterns of resources based on a random selection, a UE identifier of the UE, a location of the UE, or a network configured selection parameter. In other implementations of this case, the method 300 at block 304 may further include determining that none of the set of patterns of resources correspond to an available set of resources within a first time window corresponding to a packet delay budget for the transmitting of the packet, and selecting a pattern from the set of patterns of resources having an amount of resource collision within an acceptable collision threshold with respect to a non-available set of resources in the first time window. In this case, some implementations may further include ranking each of the sets of patterns of resources in an increasing order of number of collisions, and then the selecting of the pattern from the set of patterns of resources comprises randomly selecting from a subset of highest ranked ones of the sets of patterns of resources. In yet further implementations of this case, the method 300 at block 304 may further include determining that none of the set of patterns of resources correspond to an available set of resources within a first time window, and selecting a pattern from the set of patterns of resources having an amount of resource collision within an acceptable collision threshold with respect to a non-available set of resources in the first time window. In yet other implementations of this case, the method 300 at block 304 may further include determining that none of the set of patterns of resources correspond to an available set of resources within a first time window corresponding to a packet delay budget for the transmitting of the packet; and selecting a pattern from the set of patterns of resources within a second time window after the first time window.

In certain implementations, the processor 412, the modem 420, the transmission/reception component 198, repetition resource determiner 142, the transceiver 402, the receiver 406, the transmitter 408, the RF front end 488, and/or one or more of the subcomponents of the RF front end 488 may be configured to and/or may define means for determining a repetition resource on which to send a redundancy version of the packet, wherein the repetition resource is at a time subsequent to the first resource.

At block 306, the method 300 includes transmitting repetition resource information identifying the repetition resource to one or more neighboring UEs. For example, in an aspect, UE 104 may operate one or any combination of transmission/reception component 198, repetition resource determiner 142, modem 414, processor(s) 412, transceiver 402, RF front end 488, and antennae 465 to transmit repetition resource information 144 identifying one or more repetition resources 204 to one or more neighboring UEs. As noted, this allows the one or more neighboring UEs to avoid collision with the repetition resources 204 reserved by the UE 104. The transmission/reception component 198 and/or the processor 412 may transmit and/or receive data, such as the repetition resource information. Specifically, the transmission/reception component 198 may send the digital data associated with the repetition resource information to the transceiver 402 or the transmitter 408. The transceiver 402 and/or the transmitter 408 may convert the digital data into an electrical data signal, and send to the RF front end 488. The RF front end 488 and one or more of the subcomponents, such as the PAs 498 and/or the filters 496, may filter, amplify, and/or convert the electrical data signals into electro-magnetic transmission signals. The one or more antennas 465 may transmit electro-magnetic transmission signals containing the digital data in the repetition resource information.

In certain implementations, the processor 412, the modem 420, the transmission/reception component 198, the transceiver 402, the receiver 406, the transmitter 408, the RF front end 488, and/or one or more of the subcomponents of the RF front end 488 may be configured to and/or may define means for transmitting repetition resource information identifying the repetition resource to one or more neighboring UEs.

At block 308, the method 300 includes transmitting the redundancy version of the packet on the repetition resource. For example, in an aspect, UE 104 may operate one or any combination of transmission/reception component 198, packet generator 140 (to generate the redundancy version of the packet 141), modem 414, processor(s) 412, transceiver 402, RF front end 488, and antennae 465 to transmit the redundancy version of the packet 141 on the selected repetition resource 204. The transmission/reception component 198 and/or the processor 412 may transmit and/or receive data, such as the redundancy version of the packet. Specifically, the transmission/reception component 198 may send the digital data associated with the redundancy version of the packet to the transceiver 402 or the transmitter 408. The transceiver 402 and/or the transmitter 408 may convert the digital data into electrical data signal, and send to the RF front end 488. The RF front end 488 and one or more of the subcomponents, such as the PAs 498 and/or the filters 496, may filter, amplify, and/or convert the electrical data signals into electro-magnetic transmission signals. The one or more antennas 465 may transmit electro-magnetic transmission signals containing the digital data in the redundancy version of the packet.

In certain implementations, the processor 412, the modem 420, the transmission/reception component 198, the transceiver 402, the receiver 406, the transmitter 408, the RF front end 488, and/or one or more of the subcomponents of the RF front end 488 may be configured to and/or may define means for transmitting the redundancy version of the packet on the repetition resource.

In some examples, the transmitting of the repetition resource information includes transmitting via a control channel, which may include a side link control channel.

In some alternative or additional implementations, the method 300 may further include determining a set of one or more resources associated with a set of one or more received packets, wherein determining the repetition resource includes avoiding a time and/or frequency overlap with the set of one or more resources of the set of one or more received packets.

In some alternative or additional implementations, the method 300 may further include receiving neighboring UE repetition resource information identifying a neighboring UE repetition resource to be used by a neighboring UE for transmitting a duplicate neighboring UE packet, wherein determining the repetition resource includes excluding the neighboring UE repetition resource from a set of available resources for the repetition resource.

In some alternative or additional implementations, the method 300 may further include determining a number of repetitions of transmissions of the redundancy version of the packet, and then the determining of the repetition resource further comprises determining a set of repetition resources for the number of repetitions, wherein each of the set of repetition resources is at a different time and is subsequent to the first resource, wherein the transmitting of the repetition resource information further includes identifying the set of repetition resources for the number of repetitions, and wherein the transmitting of the redundancy version of the packet further comprises transmitting on each of the set of repetition resources.

In some alternative or additional implementations, the method 300 may further include determining a number of repetitions of transmissions of the redundancy version of the packet, wherein the number of repetitions is greater than 2. In this case, the determining of the repetition resource further comprises determining a first set of repetition resources for a one or two of the number of repetitions, wherein each of the first set of repetition resources is at a different time and is subsequent to the first resource. Further, in this case, the transmitting of the repetition resource information further includes identifying the first set of repetition resources for the one or two of the number of repetitions, and the transmitting of the redundancy version of the packet further comprises transmitting at least one of the one or two of the number of repetitions on at least a portion of the first set of repetition resources.

In the above case, an inter-repetition gap between two consecutive ones of the number of transmissions may be between a minimum gap value and a maximum gap value. In some instances, the minimum gap value and the maximum gap value are functions of a packet delay tolerance of the packet, a congestion level of transmissions in a vicinity of the UE, or both.

Also, in the above case and where the transmitting on each of the first set of repetition resources may comprise transmitting at least a first redundancy version of the packet on at least a first subset of the first set of repetition resources, the method 300 at 308 may further include determining a change in available resource. Further, the method may include determining a second set of repetition resources for at least a next one of the number of repetitions based on the change in the available resources, transmitting updated repetition resource information identifying the second set of repetition resources for at least the next one of the number of repetitions. As such, in this instance, the transmitting of the redundancy version of the packet further comprises transmitting at least the next one of the number of repetitions on the second set of repetition resources.

In some instances, determining the second set of repetition resources for the next one of the number of repetitions further comprises changing, relative to the first set of repetition resources, at least one of a number of resource blocks or a number of repetitions per transmission time interval (TTI).

In some alternative or additional implementations, the method 300 may further include receiving a non-acknowledged (NACK) signal corresponding to the transmitting of the packet on the first resource, and, in this case, the determining of the repetition resource, the transmitting of the repetition resource information, and the transmitting of the redundancy version of the packet are all in response to the NACK signal.

Figure 4:
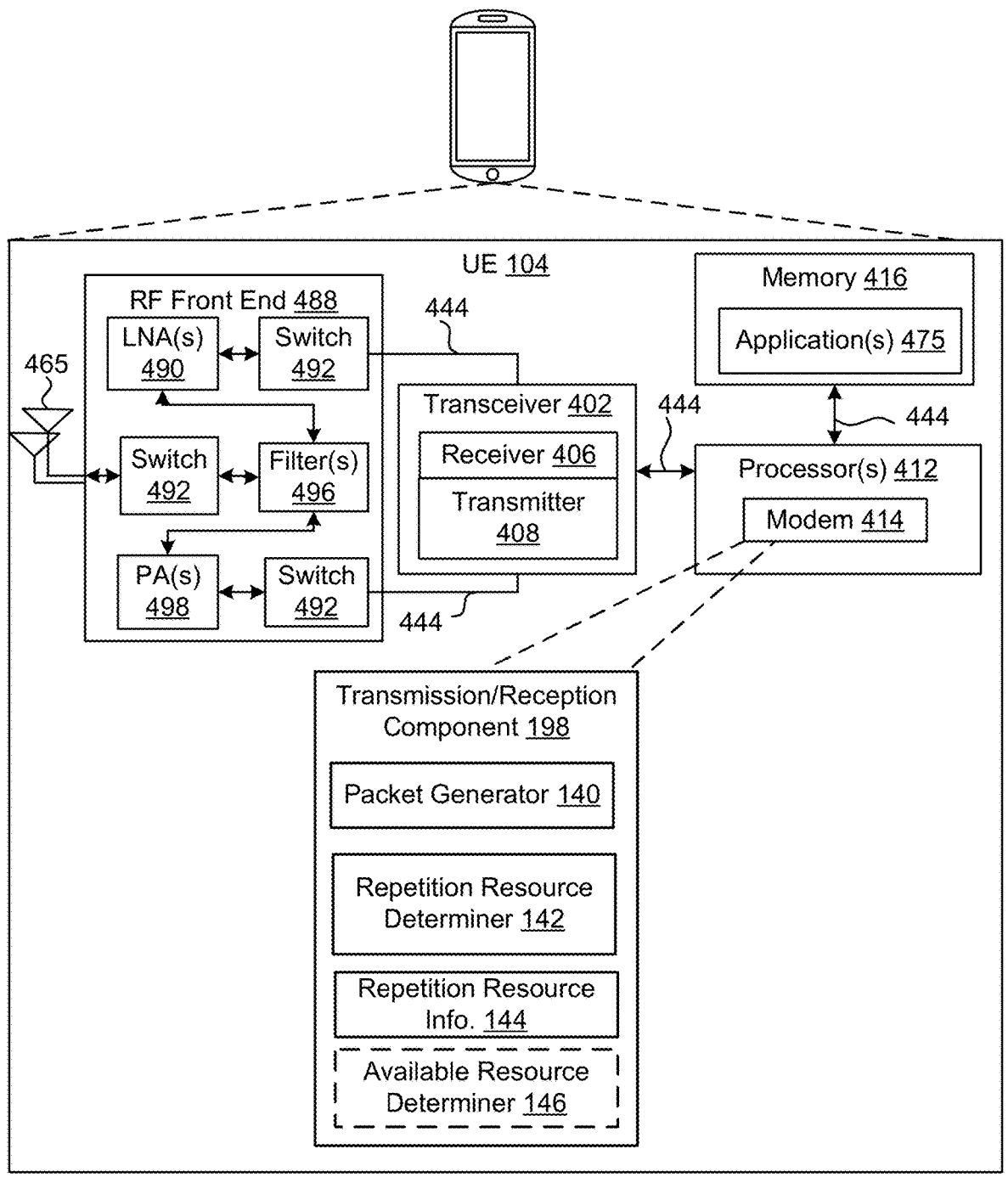
FIG. 4 is a schematic diagram of example components of the UEs of FIGS. 1 and 2.

Referring to FIG. 4, an example of an implementation of the UE 104, including UE104*a* and UE 104*b* of FIG. 1, may include a variety of components, some of which have already been described above, but including components such as one or more processors 412 and memory 416 and transceiver 402 in communication via one or more buses 444, which may operate in conjunction with modem 414, and the transmission/reception component 198 to enable one or more of the functions described herein related to repetition resource exclusion in a half duplex based communication system. Further, the one or more processors 412, modem 414, memory 416, transceiver 402, RF front end 488, and one or more antennas 465, may be configured to support voice and/or data calls (simultaneously or non-simultaneously) in one or more radio access technologies.

In an aspect, the one or more processors 412 can include a modem 414 that uses one or more modem processors. The various functions related to transmission/reception component 198 may be included in modem 414 and/or processors 412 and, in an aspect, can be executed by a single processor, while in other aspects, different ones of the functions may be executed by a combination of two or more different processors. For example, in an aspect, the one or more processors 412 may include any one or any combination of a modem processor, or a baseband processor, or a digital signal processor, or a transmit processor, or a receiver processor, or a transceiver processor associated with transceiver 402. In other aspects, some of the features of the one or more processors 412 and/or modem 414 associated with the transmission/reception component 198 may be performed by transceiver 402.

Also, memory 416 may be configured to store data used herein and/or local versions of applications 475, including transmission/reception component 198, and/or one or more of subcomponents thereof being executed by at least one processor 412. Memory 416 can include any type of computer-readable medium usable by a computer or at least one processor 412, such as random access memory (RAM), read only memory (ROM), tapes, magnetic discs, optical discs, volatile memory, non-volatile memory, and any combination thereof. In an aspect, for example, memory 416 may be a non-transitory computer-readable storage medium that stores one or more computer-executable codes defining the transmission/reception component 198, and/or one or more of subcomponents thereof, and/or data associated therewith, when UE 104 is operating at least one processor 412 to execute the transmission/reception component 198, and/or one or more subcomponents thereof.

Transceiver 402 may include at least one receiver 406 and at least one transmitter 408. Receiver 406 may include hardware, firmware, and/or software code executable by a processor for receiving data, the code comprising instructions and being stored in a memory (e.g., computer-readable medium). Receiver 406 may be, for example, a radio frequency (RF) receiver. In an aspect, receiver 406 may receive signals transmitted by at least one base station 102 or another UE 104. Additionally, receiver 406 may process such received signals, and also may obtain measurements of the signals, such as, but not limited to, Ec/Io, SNR, RSRP, RSSI, etc. Transmitter 408 may include hardware, firmware, and/or software code executable by a processor for transmitting data, the code comprising instructions and being stored in a memory (e.g., computer-readable medium). A suitable example of transmitter 408 may include, but is not limited to, an RF transmitter.

Moreover, in an aspect, UE 104 may include RF front end 488, which may operate in communication with one or more antennas 465 and transceiver 402 for receiving and transmitting radio transmissions, for example, wireless communications transmitted by at least one base station 102 or wireless transmissions transmitted by UE 104. RF front end 488 may be connected to one or more antennas 465 and can include one or more low-noise amplifiers (LNAs) 490, one or more switches 492, one or more power amplifiers (PAs) 498, and one or more filters 496 for transmitting and receiving RF signals. The one or more antennas 465 may include one or more antennas, antenna elements and/or antenna arrays, and may be controlled for beamforming communications.

In an aspect, LNA 490 can amplify a received signal at a desired output level. In an aspect, each LNA 490 may have a specified minimum and maximum gain values. In an aspect, RF front end 488 may use one or more switches 492 to select a particular LNA 490 and an associated specified gain value based on a desired gain value for a particular application.

Further, for example, one or more PA(s) 498 may be used by RF front end 488 to amplify a signal for an RF output at a desired output power level. In an aspect, each PA 498 may have specified minimum and maximum gain values. In an aspect, RF front end 488 may use one or more switches 492 to select a particular PA 498 and its specified gain value based on a desired gain value for a particular application.

Also, for example, one or more filters 496 can be used by RF front end 488 to filter a received signal to obtain an input RF signal. Similarly, in an aspect, for example, a respective filter 496 can be used to filter an output from a respective PA 498 to produce an output signal for transmission. In an aspect, each filter 496 can be connected to a specific LNA 490 and/or PA 498. In an aspect, RF front end 488 can use one or more switches 492 to select a transmit or receive path using a specified filter 496, LNA 490, and/or PA 498, based on a configuration as specified by transceiver 402 and/or processor 412.

As such, transceiver 402 may be configured to transmit and receive wireless signals through one or more antennas 465 via RF front end 488. In an aspect, transceiver may be tuned to operate at specified frequencies such that UE 104 can communicate with, for example, one or more base stations 102 or one or more cells associated with one or more base stations 102. In an aspect, for example, modem 414 can configure transceiver 402 to operate at a specified frequency and power level based on the UE configuration of the UE 104 and the communication protocol used by modem 414.

In an aspect, modem 414 can be a multiband-multimode modem, which can process digital data and communicate with transceiver 402 such that the digital data is sent and received using transceiver 402. In an aspect, modem 414 can be multiband and be configured to support multiple frequency bands for a specific communications protocol. In an aspect, modem 414 can be multimode and be configured to support multiple operating networks and communications protocols. In an aspect, modem 414 can control one or more components of UE 104 (e.g., RF front end 488, transceiver 402) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

Additional Implementations

A method of wireless communications may include transmitting a packet on a first resource, determining a repetition resource on which to send a redundancy version of the packet, wherein the repetition resource is at a time subsequent to the first resource, transmitting repetition resource information identifying the repetition resource to one or more neighboring UEs, and transmitting the redundancy version of the packet on the repetition resource.

Any of the methods above, further comprising determining a set of one or more resources associated with a set of one or more received packets, wherein determining the repetition resource includes avoiding a time and/or frequency overlap with the set of one or more resources of the set of one or more received packets.

Any of the methods above, wherein determining the repetition resource includes randomly selecting the repetition resource.

Any of the methods above, wherein the transmitting of the repetition resource information comprises transmitting via a control channel.

Any of the methods above, further comprising receiving neighboring UE repetition resource information identifying a neighboring UE repetition resource to be used by a neighboring UE for transmitting a neighboring UE packet, wherein determining the repetition resource includes excluding the neighboring UE repetition resource from a set of available resources for the repetition resource.

Any of the methods above, wherein determining the repetition resource includes at least one of determining one or a plurality of time-based resources, or determining one or a plurality of time and frequency resources.

Any of the methods above, wherein a frequency of the one or the plurality of time and frequency resources comprises either a same frequency as the first resource for the transmitting of the redundancy version of the packet, or a matching frequency for at least two consecutive transmissions of the redundancy version of the packet, or a second frequency different from a first frequency of the first resource.

Any of the methods above, wherein determining the repetition resource includes selecting the repetition resource from a set of predefined resources.

Any of the methods above, further comprising wherein the set of predefined resources includes an available set of resources within a time window corresponding to a packet delay budget for the transmitting of the packet and selecting one of the available set of resources having an amount of resource collision within an acceptable collision threshold with respect to a non-available set of resources within the time window.

Any of the methods above, further comprising ranking sets of resources in the available set of resources in an increasing order of number of collisions, wherein the selecting of one of the available set of resources comprises randomly selecting from a subset of highest ranked ones of the sets of resources.

Any of the methods above, wherein a set of patterns of resources within the set of predefined resources depends on a required amount of resources for the transmitting of the redundancy version of the packet, or for the transmitting of the redundancy version of the packet and one or more additional transmissions of the redundancy version of the packet.

Any of the methods above, wherein the required amount of resources comprises one or more of a number of resource blocks, a number of transmission time intervals (TTIs) per transmission of the redundancy version of the packet, or a number of repetitions of the transmission of the redundancy version of the packet.

Any of the methods above, further comprising selecting a pattern from the set of patterns of resources based on a random selection, a UE identifier of the UE, a location of the UE, or a network configured selection parameter.

Any of the methods above, further comprising determining that none of the set of patterns of resources correspond to an available set of resources within a first time window corresponding to a packet delay budget for the transmitting of the packet and selecting a pattern from the set of patterns of resources having an amount of resource collision within an acceptable collision threshold with respect to a non-available set of resources in the first time window.

Any of the methods above, further comprising ranking each of the sets of patterns of resources in an increasing order of number of collisions, wherein the selecting of the pattern from the set of patterns of resources comprises randomly selecting from a subset of highest ranked ones of the sets of patterns of resources.

Any of the methods above, further comprising determining that none of the set of patterns of resources correspond to an available set of resources within a first time window corresponding to a packet delay budget for the transmitting of the packet and selecting a pattern from the set of patterns of resources within a second time window after the first time window.

Any of the methods above, further comprising determining a number of repetitions of transmissions of the redundancy version of the packet, wherein the determining of the repetition resource further comprises determining a set of repetition resources for the number of repetitions, wherein each of the set of repetition resources is at a different time and is subsequent to the first resource, wherein the transmitting of the repetition resource information further includes identifying the set of repetition resources for the number of repetitions, and wherein the transmitting of the redundancy version of the packet further comprises transmitting on each of the set of repetition resources.

Any of the methods above, further comprising determining a number of repetitions of transmissions of the redundancy version of the packet, wherein the number of repetitions is greater than 2, wherein the determining of the repetition resource further comprises determining a first set of repetition resources for a one or two of the number of repetitions, wherein each of the first set of repetition resources is at a different time and is subsequent to the first resource, wherein the transmitting of the repetition resource information further includes identifying the first set of repetition resources for the one or two of the number of repetitions, and wherein the transmitting of the redundancy version of the packet further comprises transmitting at least one of the one or two of the number of repetitions on at least a portion of the first set of repetition resources.

Any of the methods above, wherein an inter-repetition gap between two consecutive ones of the number of transmissions is between a minimum gap value and a maximum gap value.

Any of the methods above, wherein the minimum gap value and the maximum gap value are functions of a packet delay tolerance of the packet, a congestion level of transmissions in a vicinity of the UE, or both.

Any of the methods above, further comprising wherein the transmitting on each of the first set of repetition resources comprises transmitting at least a first redundancy version of the packet on at least a first subset of the first set of repetition resources, determining a change in available resources, determining a second set of repetition resources for at least a next one of the number of repetitions based on the change in the available resources, transmitting updated repetition resource information identifying the second set of repetition resources for at least the next one of the number of repetitions, and wherein the transmitting of the redundancy version of the packet further comprises transmitting at least the next one of the number of repetitions on the second set of repetition resources.

Any of the methods above, wherein determining the second set of repetition resources for the next one of the number of repetitions further comprises changing, relative to the first set of repetition resources, at least one of a number of resource blocks or a number of repetitions per transmission time interval (TTI).

Any of the methods above, further comprising receiving a non-acknowledged (NACK) signal corresponding to the transmitting of the packet on the first resource, wherein the determining of the repetition resource, the transmitting of the repetition resource information, and the transmitting of the redundancy version of the packet are all in response to the NACK signal.

Any of the methods above, further comprising receiving neighboring UE repetition resource information identifying a neighboring UE repetition resource to be used by a neighboring UE for transmitting a first neighboring UE packet, determining whether a NACK signal was received for a second neighboring UE packet corresponding to the first neighboring UE packet, wherein determining the repetition resource includes excluding the neighboring UE repetition resource from a set of available resources for the repetition resource based on determining that the NACK signal was received for the second neighboring UE packet, and wherein determining the repetition resource includes including the neighboring UE repetition resource in a set of available resources for the repetition resource based on determining that the NACK signal was not received for the second neighboring UE packet.

A non-transitory computer-readable medium of a UE, the computer-readable medium storing computer executable code may include code to transmit a packet on a first resource, determine a repetition resource on which to send a redundancy version of the packet, wherein the repetition resource is at a time subsequent to the first resource, transmit repetition resource information identifying the repetition resource to one or more neighboring UEs, and transmit the redundancy version of the packet on the repetition resource.

Any of the non-transitory computer-readable media above, further comprising code to receive a non-acknowledged (NACK) signal corresponding to the transmitting of the packet on the first resource, wherein the determining of the repetition resource, the transmitting of the repetition resource information, and the transmitting of the redundancy version of the packet are all in response to the NACK signal.

A user equipment may have a memory and a processor in communication with the memory, wherein the processor is configured to transmit a packet on a first resource, determine a repetition resource on which to send a redundancy version of the packet, wherein the repetition resource is at a time subsequent to the first resource, transmit repetition resource information identifying the repetition resource to one or more neighboring UEs, and transmit the redundancy version of the packet on the repetition resource.

Any of the UEs above, wherein the processor is further configured to receive a non-acknowledged (NACK) signal corresponding to the transmitting of the packet on the first resource, wherein the determining of the repetition resource, the transmitting of the repetition resource information, and the transmitting of the redundancy version of the packet are all in response to the NACK signal.

A user equipment may have means for transmitting a packet on a first resource, means for determining a repetition resource on which to send a redundancy version of the packet, wherein the repetition resource is at a time subsequent to the first resource, means for transmitting repetition resource information identifying the repetition resource to one or more neighboring UEs, and transmitting the redundancy version of the packet on the repetition resource.

Any of the UEs above, further comprising means for receiving a non-acknowledged (NACK) signal corresponding to the transmitting of the packet on the first resource, wherein the determining of the repetition resource, the transmitting of the repetition resource information, and the transmitting of the redundancy version of the packet are all in response to the NACK signal.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
    transmitting a packet on a first resource;
    determining a repetition resource on which to send a redundancy version of the packet, wherein the repetition resource is at a time subsequent to the first resource;
    transmitting repetition resource information identifying the repetition resource to one or more neighboring UEs; and
    transmitting the redundancy version of the packet on the repetition resource.

2. The method of claim 1, further comprising:
    determining a set of one or more resources associated with a set of one or more received packets; and
    wherein determining the repetition resource includes avoiding a time and/or frequency overlap with the set of one or more resources of the set of one or more received packets.

3. The method of claim 1, wherein determining the repetition resource includes randomly selecting the repetition resource.

4. The method of claim 1, wherein the transmitting of the repetition resource information comprises transmitting via a control channel.

5. The method of claim 1, further comprising:
    receiving neighboring UE repetition resource information identifying a neighboring UE repetition resource to be used by a neighboring UE for transmitting a neighboring UE packet; and
    wherein determining the repetition resource includes excluding the neighboring UE repetition resource from a set of available resources for the repetition resource.

6. The method of claim 1, wherein determining the repetition resource includes at least one of determining one or a plurality of time-based resources, or determining one or a plurality of time and frequency resources.

7. The method of claim 6, wherein a frequency of the one or the plurality of time and frequency resources comprises either a same frequency as the first resource for the transmitting of the redundancy version of the packet, or a matching frequency for at least two consecutive transmissions of the redundancy version of the packet, or a second frequency different from a first frequency of the first resource.

8. The method of claim 1, wherein determining the repetition resource includes selecting the repetition resource from a set of predefined resources.

9. The method of claim 8, further comprising:
wherein the set of predefined resources includes an available set of resources within a time window corresponding to a packet delay budget for the transmitting of the packet; and
selecting one of the available set of resources having an amount of resource collision within an acceptable collision threshold with respect to a non-available set of resources within the time window.

10. The method of claim 9, further comprising:
ranking sets of resources in the available set of resources in an increasing order of number of collisions; and
wherein the selecting of one of the available set of resources comprises randomly selecting from a subset of highest ranked ones of the sets of resources.

11. The method of claim 8, wherein a set of patterns of resources within the set of predefined resources depends on a required amount of resources for the transmitting of the redundancy version of the packet, or for the transmitting of the redundancy version of the packet and one or more additional transmissions of the redundancy version of the packet.

12. The method of claim 11, wherein the required amount of resources comprises one or more of a number of resource blocks, a number of transmission time intervals (TTIs) per transmission of the redundancy version of the packet, or a number of repetitions of the transmission of the redundancy version of the packet.

13. The method of claim 11, further comprising selecting a pattern from the set of patterns of resources based on a random selection, a UE identifier of the UE, a location of the UE, or a network configured selection parameter.

14. The method of claim 11, further comprising:
determining that none of the set of patterns of resources correspond to an available set of resources within a first time window corresponding to a packet delay budget for the transmitting of the packet; and
selecting a pattern from the set of patterns of resources having an amount of resource collision within an acceptable collision threshold with respect to a non-available set of resources in the first time window.

15. The method of claim 14, further comprising:
ranking each of the sets of patterns of resources in an increasing order of number of collisions; and
wherein the selecting of the pattern from the set of patterns of resources comprises randomly selecting from a subset of highest ranked ones of the sets of patterns of resources.

16. The method of claim 11, further comprising:
determining that none of the set of patterns of resources correspond to an available set of resources within a first time window corresponding to a packet delay budget for the transmitting of the packet; and
selecting a pattern from the set of patterns of resources within a second time window after the first time window.

17. The method of claim 1, further comprising:
determining a number of repetitions of transmissions of the redundancy version of the packet;
wherein the determining of the repetition resource further comprises determining a set of repetition resources for the number of repetitions, wherein each of the set of repetition resources is at a different time and is subsequent to the first resource;
wherein the transmitting of the repetition resource information further includes identifying the set of repetition resources for the number of repetitions; and
wherein the transmitting of the redundancy version of the packet further comprises transmitting on each of the set of repetition resources.

18. The method of claim 1, further comprising:
determining a number of repetitions of transmissions of the redundancy version of the packet, wherein the number of repetitions is greater than 2;
wherein the determining of the repetition resource further comprises determining a first set of repetition resources for a one or two of the number of repetitions, wherein each of the first set of repetition resources is at a different time and is subsequent to the first resource;
wherein the transmitting of the repetition resource information further includes identifying the first set of repetition resources for the one or two of the number of repetitions; and
wherein the transmitting of the redundancy version of the packet further comprises transmitting at least one of the one or two of the number of repetitions on at least a portion of the first set of repetition resources.

19. The method of claim 18, wherein an inter-repetition gap between two consecutive ones of the number of transmissions is between a minimum gap value and a maximum gap value.

20. The method of claim 18, wherein a minimum gap value and a maximum gap value are functions of a packet delay tolerance of the packet, a congestion level of transmissions in a vicinity of the UE, or both.

21. The method of claim 18, further comprising:
wherein the transmitting on each of the first set of repetition resources comprises transmitting at least a first redundancy version of the packet on at least a first subset of the first set of repetition resources;
determining a change in available resources;
determining a second set of repetition resources for at least a next one of the number of repetitions based on the change in the available resources;
transmitting updated repetition resource information identifying the second set of repetition resources for at least the next one of the number of repetitions; and
wherein the transmitting of the redundancy version of the packet further comprises transmitting at least the next one of the number of repetitions on the second set of repetition resources.

22. The method of claim 21, wherein determining the second set of repetition resources for the next one of the number of repetitions further comprises changing, relative to the first set of repetition resources, at least one of a number of resource blocks or a number of repetitions per transmission time interval (TTI).

23. The method of claim 1, further comprising:
receiving a non-acknowledged (NACK) signal corresponding to the transmitting of the packet on the first resource; and
wherein the determining of the repetition resource, the transmitting of the repetition resource information, and the transmitting of the redundancy version of the packet are all in response to the NACK signal.

24. The method of claim 1, further comprising:
receiving neighboring UE repetition resource information identifying a neighboring UE repetition resource to be used by a neighboring UE for transmitting a first neighboring UE packet;
determining whether a NACK signal was received for a second neighboring UE packet corresponding to the first neighboring UE packet;

wherein determining the repetition resource includes excluding the neighboring UE repetition resource from a set of available resources for the repetition resource based on determining that the NACK signal was received for the second neighboring UE packet; and wherein determining the repetition resource includes including the neighboring UE repetition resource in a set of available resources for the repetition resource based on determining that the NACK signal was not received for the second neighboring UE packet.

25. A non-transitory computer-readable medium of a UE, the computer-readable medium storing computer executable code comprising code to:
   transmit a packet on a first resource;
   determine a repetition resource on which to send a redundancy version of the packet, wherein the repetition resource is at a time subsequent to the first resource;
   transmit repetition resource information identifying the repetition resource to one or more neighboring UEs; and
   transmit the redundancy version of the packet on the repetition resource.

26. The non-transitory computer-readable medium of claim 25, further comprising code to:
   receive a non-acknowledged (NACK) signal corresponding to the transmitting of the packet on the first resource; and
   wherein the determining of the repetition resource, the transmitting of the repetition resource information, and the transmitting of the redundancy version of the packet are all in response to the NACK signal.

27. The non-transitory computer-readable medium of claim 25, further comprising code to:
   determine a set of one or more resources associated with a set of one or more received packets; and
   wherein code to determine the repetition resource includes code to avoid a time and/or frequency overlap with the set of one or more resources of the set of one or more received packets.

28. The non-transitory computer-readable medium of claim 25, wherein the code to determine the repetition resource includes code to randomly select the repetition resource.

29. The non-transitory computer-readable medium of claim 25, wherein the code to transmit of the repetition resource information comprises code to transmit via a control channel.

30. The non-transitory computer-readable medium of claim 25, further comprising code to:
   receive neighboring UE repetition resource information identifying a neighboring UE repetition resource to be used by a neighboring UE for transmitting a neighboring UE packet; and
   wherein code to determine the repetition resource includes code to exclude the neighboring UE repetition resource from a set of available resources for the repetition resource.

31. The non-transitory computer-readable medium of claim 25, wherein the code to determine the repetition resource includes code to at least one of determine one or a plurality of time-based resources, or determine one or a plurality of time and frequency resources.

32. The non-transitory computer-readable medium of claim 31, wherein a frequency of the one or the plurality of time and frequency resources comprises either a same frequency as the first resource for the transmitting of the redundancy version of the packet, or a matching frequency for at least two consecutive transmissions of the redundancy version of the packet, or a second frequency different from a first frequency of the first resource.

33. The non-transitory computer-readable medium of claim 25, wherein the code to determine the repetition resource includes code to select the repetition resource from a set of predefined resources.

34. The non-transitory computer-readable medium of claim 33, wherein a set of patterns of resources within the set of predefined resources depends on a required amount of resources for the transmitting of the redundancy version of the packet, or for the transmitting of the redundancy version of the packet and one or more additional transmissions of the redundancy version of the packet.

35. The non-transitory computer-readable medium of claim 34, wherein the required amount of resources comprises one or more of a number of resource blocks, a number of transmission time intervals (TTIs) per transmission of the redundancy version of the packet, or a number of repetitions of the transmission of the redundancy version of the packet.

36. The non-transitory computer-readable medium of claim 34, further comprising code to select a pattern from the set of patterns of resources based on a random selection, a UE identifier of the UE, a location of the UE, or a network configured selection parameter.

37. The non-transitory computer-readable medium of claim 34, further comprising code to:
   determine that none of the set of patterns of resources correspond to an available set of resources within a first time window corresponding to a packet delay budget for the transmitting of the packet; and
   select a pattern from the set of patterns of resources having an amount of resource collision within an acceptable collision threshold with respect to a non-available set of resources in the first time window.

38. The non-transitory computer-readable medium of claim 25, further comprising code to:
   determine a number of repetitions of transmissions of the redundancy version of the packet;
   wherein the code to determine of the repetition resource further comprises code to determine a set of repetition resources for the number of repetitions, wherein each of the set of repetition resources is at a different time and is subsequent to the first resource;
   wherein the code to transmit the repetition resource information further includes code to identify the set of repetition resources for the number of repetitions; and
   wherein the code to transmit the redundancy version of the packet further comprises code to transmit on each of the set of repetition resources.

39. The non-transitory computer-readable medium of claim 25, further comprising code to:
   determine a number of repetitions of transmissions of the redundancy version of the packet, wherein the number of repetitions is greater than 2;
   wherein the code to determine of the repetition resource further comprises code to determine a first set of repetition resources for a one or two of the number of repetitions, wherein each of the first set of repetition resources is at a different time and is subsequent to the first resource;
   wherein the code to transmit the repetition resource information further includes code to identify the first set of repetition resources for the one or two of the number of repetitions; and
   wherein the code to transmit the redundancy version of the packet further comprises code to transmit at least one of the one or two of the number of repetitions on at least a portion of the first set of repetition resources.

40. A user equipment (UE) for wireless communication, comprising:
a memory; and
a processor in communication with the memory, wherein the processor is configured to:
transmit a packet on a first resource;
determine a repetition resource on which to send a redundancy version of the packet, wherein the repetition resource is at a time subsequent to the first resource;
transmit repetition resource information identifying the repetition resource to one or more neighboring UEs; and
transmit the redundancy version of the packet on the repetition resource.

41. The UE of claim 40, wherein the processor is further configured to:
receive a non-acknowledged (NACK) signal corresponding to the transmitting of the packet on the first resource; and
wherein the determining of the repetition resource, the transmitting of the repetition resource information, and the transmitting of the redundancy version of the packet are all in response to the NACK signal.

42. The UE of claim 40, wherein the processor is configured further to:
determine a set of one or more resources associated with a set of one or more received packets; and
wherein determining the repetition resource includes avoiding a time and/or frequency overlap with the set of one or more resources of the set of one or more received packets.

43. The UE of claim 40, wherein determining the repetition resource includes randomly selecting the repetition resource.

44. The UE of claim 40, wherein the transmitting of the repetition resource information comprises transmitting via a control channel.

45. The UE of claim 40, wherein the processor is configured further to:
receive neighboring UE repetition resource information identifying a neighboring UE repetition resource to be used by a neighboring UE for transmitting a neighboring UE packet; and
wherein determining the repetition resource includes excluding the neighboring UE repetition resource from a set of available resources for the repetition resource.

46. The UE of claim 40, wherein determining the repetition resource includes at least one of determining one or a plurality of time-based resources, or determining one or a plurality of time and frequency resources.

47. The UE of claim 46, wherein a frequency of the one or the plurality of time and frequency resources comprises either a same frequency as the first resource for the transmitting of the redundancy version of the packet, or a matching frequency for at least two consecutive transmissions of the redundancy version of the packet, or a second frequency different from a first frequency of the first resource.

48. The UE of claim 40, wherein determining the repetition resource includes selecting the repetition resource from a set of predefined resources.

49. The UE of claim 48, wherein the processor is configured further to:

wherein the set of predefined resources includes an available set of resources within a time window corresponding to a packet delay budget for the transmitting of the packet; and
select one of the available set of resources having an amount of resource collision within an acceptable collision threshold with respect to a non-available set of resources within the time window.

50. The UE of claim 49, wherein the processor is configured further to:
rank sets of resources in the available set of resources in an increasing order of number of collisions; and
wherein the selecting of one of the available set of resources comprises randomly selecting from a subset of highest ranked ones of the sets of resources.

51. The UE of claim 48, wherein a set of patterns of resources within the set of predefined resources depends on a required amount of resources for the transmitting of the redundancy version of the packet, or for the transmitting of the redundancy version of the packet and one or more additional transmissions of the redundancy version of the packet.

52. The UE of claim 51, wherein the required amount of resources comprises one or more of a number of resource blocks, a number of transmission time intervals (TTIs) per transmission of the redundancy version of the packet, or a number of repetitions of the transmission of the redundancy version of the packet.

53. The UE of claim 51, wherein the processor is configured further to select a pattern from the set of patterns of resources based on a random selection, a UE identifier of the UE, a location of the UE, or a network configured selection parameter.

54. The UE of claim 51, wherein the processor is configured further to:
determine that none of the set of patterns of resources correspond to an available set of resources within a first time window corresponding to a packet delay budget for the transmitting of the packet; and
select a pattern from the set of patterns of resources having an amount of resource collision within an acceptable collision threshold with respect to a non-available set of resources in the first time window.

55. The UE of claim 54, wherein the processor is configured further to:
rank each of the sets of patterns of resources in an increasing order of number of collisions; and
wherein the selecting of the pattern from the set of patterns of resources comprises randomly selecting from a subset of highest ranked ones of the sets of patterns of resources.

56. The UE of claim 51, wherein the processor is configured further to:
determine that none of the set of patterns of resources correspond to an available set of resources within a first time window corresponding to a packet delay budget for the transmitting of the packet; and
select a pattern from the set of patterns of resources within a second time window after the first time window.

57. The UE of claim 40, wherein the processor is configured further to:
determine a number of repetitions of transmissions of the redundancy version of the packet;
wherein the determining of the repetition resource further comprises determining a set of repetition resources for the number of repetitions, wherein each of the set of repetition resources is at a different time and is subsequent to the first resource;
    wherein the transmitting of the repetition resource information further includes identifying the set of repetition resources for the number of repetitions; and
    wherein the transmitting of the redundancy version of the packet further comprises transmitting on each of the set of repetition resources.
58. The UE of claim 40, wherein the processor is configured further to:
    determine a number of repetitions of transmissions of the redundancy version of the packet, wherein the number of repetitions is greater than 2;
    wherein the determining of the repetition resource further comprises determining a first set of repetition resources for a one or two of the number of repetitions, wherein each of the first set of repetition resources is at a different time and is subsequent to the first resource;
    wherein the transmitting of the repetition resource information further includes identifying the first set of repetition resources for the one or two of the number of repetitions; and
    wherein the transmitting of the redundancy version of the packet further comprises transmitting at least one of the one or two of the number of repetitions on at least a portion of the first set of repetition resources.
59. The UE of claim 58, wherein an inter-repetition gap between two consecutive ones of the number of transmissions is between a minimum gap value and a maximum gap value.
60. The UE of claim 58, wherein a minimum gap value and a maximum gap value are functions of a packet delay tolerance of the packet, a congestion level of transmissions in a vicinity of the UE, or both.
61. The UE of claim 58, wherein the processor is configured further to:
    wherein the transmitting on each of the first set of repetition resources comprises transmitting at least a first redundancy version of the packet on at least a first subset of the first set of repetition resources;
    determine a change in available resources;
    determine a second set of repetition resources for at least a next one of the number of repetitions based on the change in the available resources;
    transmit updated repetition resource information identifying the second set of repetition resources for at least the next one of the number of repetitions; and
    wherein the transmitting of the redundancy version of the packet further comprises transmitting at least the next one of the number of repetitions on the second set of repetition resources.
62. The UE of claim 61, wherein determining the second set of repetition resources for the next one of the number of repetitions further comprises changing, relative to the first set of repetition resources, at least one of a number of resource blocks or a number of repetitions per transmission time interval (TTI).
63. The UE of claim 40, wherein the processor is configured further to:
    receive neighboring UE repetition resource information identifying a neighboring UE repetition resource to be used by a neighboring UE for transmitting a first neighboring UE packet;
    determine whether a NACK signal was received for a second neighboring UE packet corresponding to the first neighboring UE packet;
    wherein determining the repetition resource includes excluding the neighboring UE repetition resource from a set of available resources for the repetition resource based on determining that the NACK signal was received for the second neighboring UE packet; and
    wherein determining the repetition resource includes including the neighboring UE repetition resource in a set of available resources for the repetition resource based on determining that the NACK signal was not received for the second neighboring UE packet.
64. A user equipment (UE), comprising:
    means for transmitting a packet on a first resource;
    means for determining a repetition resource on which to send a redundancy version of the packet, wherein the repetition resource is at a time subsequent to the first resource;
    means for transmitting repetition resource information identifying the repetition resource to one or more neighboring UEs; and
    transmitting the redundancy version of the packet on the repetition resource.
65. The UE of claim 64, further comprising:
    means for receiving a non-acknowledged (NACK) signal corresponding to the transmitting of the packet on the first resource; and
    wherein the determining of the repetition resource, the transmitting of the repetition resource information, and the transmitting of the redundancy version of the packet are all in response to the NACK signal.
66. The UE of claim 64, further comprising:
    means for determine a set of one or more resources associated with a set of one or more received packets; and
    wherein means for determining the repetition resource includes means for avoiding a time and/or frequency overlap with the set of one or more resources of the set of one or more received packets.
67. The UE of claim 64, wherein means for determining the repetition resource includes means for randomly selecting the repetition resource.
68. The UE of claim 64, wherein the means for transmitting of the repetition resource information comprises means for transmitting via a control channel.
69. The UE of claim 64, further comprising:
    means for receiving neighboring UE repetition resource information identifying a neighboring UE repetition resource to be used by a neighboring UE for transmitting a neighboring UE packet; and
    wherein means for determining the repetition resource includes means for excluding the neighboring UE repetition resource from a set of available resources for the repetition resource.
70. The UE of claim 64, wherein the code to determine the repetition resource includes code to at least one of determine one or a plurality of time-based resources, or determine one or a plurality of time and frequency resources.
71. The UE of claim 70, wherein a frequency of the one or the plurality of time and frequency resources comprises either a same frequency as the first resource for the transmitting of the redundancy version of the packet, or a matching frequency for at least two consecutive transmissions of the redundancy version of the packet, or a second frequency different from a first frequency of the first resource.
72. The UE of claim 64, wherein the means for determining the repetition resource includes means for selecting the repetition resource from a set of predefined resources.

73. The UE of claim 72, wherein a set of patterns of resources within the set of predefined resources depends on a required amount of resources for the transmitting of the redundancy version of the packet, or for the transmitting of the redundancy version of the packet and one or more additional transmissions of the redundancy version of the packet.

74. The UE of claim 73, wherein the required amount of resources comprises one or more of a number of resource blocks, a number of transmission time intervals (TTIs) per transmission of the redundancy version of the packet, or a number of repetitions of the transmission of the redundancy version of the packet.

75. The UE of claim 73, further comprising means for selecting a pattern from the set of patterns of resources based on a random selection, a UE identifier of the UE, a location of the UE, or a network configured selection parameter.

76. The UE of claim 73, further comprising:
means for determining that none of the set of patterns of resources correspond to an available set of resources within a first time window corresponding to a packet delay budget for the transmitting of the packet; and
means for selecting a pattern from the set of patterns of resources having an amount of resource collision within an acceptable collision threshold with respect to a non-available set of resources in the first time window.

77. The UE of claim 64, further comprising:
means for determining a number of repetitions of transmissions of the redundancy version of the packet;
wherein means for determining of the repetition resource further comprises means for determining a set of repetition resources for the number of repetitions, wherein each of the set of repetition resources is at a different time and is subsequent to the first resource;
wherein means for transmitting the repetition resource information further includes means for identifying the set of repetition resources for the number of repetitions; and
wherein means for transmitting the redundancy version of the packet further comprises means for transmitting on each of the set of repetition resources.

78. The UE of claim 64, further comprising:
means for determining a number of repetitions of transmissions of the redundancy version of the packet, wherein the number of repetitions is greater than 2;
wherein means for determining of the repetition resource further comprises means for determining a first set of repetition resources for a one or two of the number of repetitions, wherein each of the first set of repetition resources is at a different time and is subsequent to the first resource;
wherein means for transmitting the repetition resource information further includes means for identifying the first set of repetition resources for the one or two of the number of repetitions; and
wherein means for transmitting the redundancy version of the packet further comprises means for transmitting at least one of the one or two of the number of repetitions on at least a portion of the first set of repetition resources.

\* \* \* \* \*